United States Patent [19]

Kajiwara et al.

[11] Patent Number: 5,759,478
[45] Date of Patent: Jun. 2, 1998

[54] MANDREL STRUCTURE FOR USE IN MANUFACTURE OF CELLULOSE FOOD CASING

[75] Inventors: Edward Makoto Kajiwara, Park Ridge; Brant Anton Loichinger, Orland Park, both of Ill.

[73] Assignee: Viskase Corporation, Chicago, Ill.

[21] Appl. No.: 827,152

[22] Filed: Mar. 27, 1997

[51] Int. Cl.$^6$ .................. B29C 47/00; B29C 47/20; B29C 55/28

[52] U.S. Cl. .......... 264/559; 264/102; 264/187; 264/203; 264/209.5; 264/211.11; 264/561; 264/562; 264/563; 425/71; 425/380; 425/467

[58] Field of Search .................. 264/102, 187, 264/203, 209.5, 211.11, 559, 561, 562, 563; 425/71, 380, 467

[56] References Cited

U.S. PATENT DOCUMENTS

| | | | |
|---|---|---|---|
| 2,105,273 | 1/1938 | Smith | 493/274 |
| 2,144,900 | 1/1939 | Smith | 156/218 |
| 3,193,547 | 7/1965 | Schott, Jr. | 264/209.5 |
| 3,655,846 | 4/1972 | Kanoh et al. | 264/559 |
| 3,819,776 | 6/1974 | Robinson et al. | 264/40.3 |
| 3,976,410 | 8/1976 | Jack et al. | 425/71 |
| 4,003,973 | 1/1977 | Kurokawa et al. | 264/101 |
| 4,195,054 | 3/1980 | Verellen et al. | 264/558 |
| 4,203,942 | 5/1980 | Sims, Jr. et al. | 264/559 |
| 4,317,794 | 3/1982 | Gord et al. | 264/559 |
| 5,277,857 | 1/1994 | Nicholson et al. | 264/187 |
| 5,451,364 | 9/1995 | Ducharme, Jr. et al. | 264/559 |
| 5,607,639 | 3/1997 | Zikeli et al. | 264/561 |

Primary Examiner—Leo B. Tentoni
Attorney, Agent, or Firm—Roger Aceto

[57] ABSTRACT

The tubular extrusion of a thermoplastic nonderivatized cellulose solution about a mandrel and through a long air gap in excess of 304 mm is facilitated by use of a mandrel which is extensible from the extrusion die. On extrusion start-up, the mandrel extends a short length from the die. For steady-state operation, the mandrel is extended its full length from the die. Also disclosed is a mandrel structure to facilitate the introduction of a nonsolvent liquid into the interior of the extruded tube at a high location on start-up of extrusion and at a lower location during steady-state operation. The mandrel also includes a sizing portion having circumferential grooves which gather gas bubbles that may evolve at the interface between the extruded tube and the sizing portion. Vertical channels in the sizing portion connect these grooves and provide the passage of gas bubbles into a volume below the mandrel.

12 Claims, 3 Drawing Sheets

MANDREL STRUCTURE FOR USE IN MANUFACTURE OF CELLULOSE FOOD CASING

TECHNICAL FIELD

The present invention relates to a method and apparatus of forming a seamless cellulose tube, suitable for use as a food casing, using a solution of nonderivatized cellulose, tertiary amine N-oxide and water.

BACKGROUND OF THE INVENTION

Cellulose food casings are well known in the art and are widely used in the production of stuffed food products such as sausages and the like. Cellulose food casings generally are seamless tubes formed of a regenerated cellulose and contain a plasticizer such as water and/or a polyol such as glycerine. Plasticization is necessary because otherwise the cellulose tube is too brittle for handling and commercial use.

Cellulose food casings generally are used in one of two forms. In one form the casing consists of a tubular film of pure regenerated and nonreinforced cellulose having a wall thickness ranging from about 0.025 mm to about 0.076 mm and made in tube diameters of about 14.5 mm to 203.2 mm. The second form is a reinforced casing wherein the tubular wall of the casing consists of a regenerated cellulose bonded to a paper web. Such reinforced casings are commonly called "fibrous" casings to distinguish them from the nonreinforced cellulose casings. Fibrous casings have a wall thickness in the range of 0.050 mm to 0.102 mm thick and are made in diameters of about 40.6 mm to 193 mm or greater. The present invention relates to manufacture of the nonreinforced type of cellulose casing hereinafter referred to simply as "cellulose casing".

The cellulose for making casing is most commonly produced by the well known and so called "viscose process" wherein viscose, a soluble cellulose derivative, is extruded as a tubular film through an annular die into coagulating and regenerating baths to produce a tube of regenerated cellulose. This tube is subsequently washed, plasticized with glycerine or other polyol, and dried. Drying usually is accomplished while the tube is inflated with air at a pressure sufficient both to maintain a constant tube diameter and to orient the film.

The present invention involves an alternate cellulose production method in which a cellulose solution is formed by means of a simple dissolution rather than requiring the formation of a cellulose derivative prior to forming a soluble substance (as in the viscose process). A cellulose dissolution process is described, for example, in U.S. Pat. No. 2,179,181 wherein a natural cellulose is dissolved by a tertiary amine N-oxide to produce solutions of relatively low solids content. The cellulose in the resulting solution is "nonderivatized" in that the natural cellulose was not chemically reacted prior to dissolution to produce a soluble cellulose derivative as would occur for example, in the viscose process. U.S. Pat. No. 3,447,939 discloses use of N-methyl-morpholine-N-oxide (NMMO) as the tertiary amine N-oxide solvent wherein the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 patent.

U.S. Pat. No. 5,277,857 discloses a method and apparatus for manufacturing cellulose food casing from a solution comprising nonderivatized cellulose, NMMO and water.

In the '857 patent, nonderivatized cellulose in a molten state is extruded as a tubular film into a nonsolvent liquid such as a water bath. In the water bath, the NMMO solvent is removed to regenerate or precipitate the nonderivatized cellulose. This forms a gel tube which is treated with water, a polyhydric alcohol such as glycerine, or other water soluble softening agent such as a polyalkylene oxide or a polyalkylene glycol prior to drying.

More specifically, in the manufacturing method of the '857 patent, the following steps are employed:

a) providing a solution comprising nonderivatized cellulose in an amine oxide solvent;

b) downwardly extruding the solution from an annular orifice to form a seamless tube of at least 14.5 mm diameter;

c) passing the extruded seamless tube of solution downwardly from the orifice first through an air gap and then into a bath of nonsolvent liquid;

d) introducing a nonsolvent liquid into the interior of said extruded seamless tube at a location below the annular orifice and above the surface of the bath of nonsolvent liquid;

e) downwardly flowing the nonsolvent liquid concurrently with the inner surface of said downwardly moving extruded seamless tube of solution and into said bath as the tube moves through said air gap, and contacting the inner surface of said extruded seamless tube with nonsolvent liquid in the course of said concurrent flow to precipitate nonderivatized cellulose at said inner surface from said solution;

f) maintaining said extruded seamless tube of solution in said bath with its inner and outer surfaces in direct contact with said nonsolvent liquid thereby further precipitating said nonderivatized cellulose from said solution and forming a nonderivatized cellulose tube; and g) removing said nonderivatized cellulose tube from said bath and contacting same with a water soluble softener.

In U.S. Pat. No. 5,451,364 the manufacturing method as disclosed in the prior '857 patent is improved by the discovery that extruding the thermoplastic cellulose solution through a long air gap improves the properties of the resulting tubular cellulose film. In particular, the '364 patent discloses that the air gap should be over 152.4 mm and preferably from 152.4 mm to 304.88 mm long and perhaps longer.

Both the '364 and '857 patents further disclose the use of a mandrel which depends from the extrusion die and about which the thermoplastic cellulose solution is extruded. This mandrel extends through the air gap and has its lower end face disposed below the level of the nonsolvent liquid bath. The mandrel for most of its length is a slender shaft. The lower portion, however, is larger in diameter and is as large as, or larger than, the extruded tube diameter so it contacts around the entire inner circumference of the extruded tube. The mandrel shaft, being smaller in diameter, is radially spaced from the inner surface of the extruded tube.

The large diameter lower portion of the mandrel serves to size the tube as it enters the bath. Also, since it contacts the extruded tube, the enlarged lower portion of the mandrel together with the extrusion die provide spaced bearing points for stabilizing the extruded tube and preventing it from wandering.

The mandrel also is used to introduce a nonsolvent liquid into the interior of the extruded tube. One function of this introduced nonsolvent liquid, among others, is to lubricate around the circumference of the lower portion of the mandrel to prevent the extruded tube from binding as it passes over the surface of the lower portion or blocking when it later is collapsed to a flat width.

In this regard, a nonsolvent liquid or "inner bath" is introduced inside the extruded tube through ports in the mandrel shaft. This inner bath flows down the mandrel and pools where the extruded tube meets the enlarged lower end of the mandrel. This pooling distributes the nonsolvent around the mandrel so the entire outer circumference of the mandrel lower portion is wetted. Nonsolvent liquid then flows off the mandrel and to the bath within the extruded tube.

It now has been found that a still longer air gap and mandrel will further improve the properties of the resulting tubular cellulose film. However, at an air gap length of over 304.8 mm and up to 500 mm or more, problems have been encountered on the start-up of the extrusion operation with the mandrel structure as disclosed in the '857 and '364 patents.

These problems include, for example, the difficulty of guiding the leading end of the extruded tube down the full length of the mandrel without contacting the mandrel surface. Running the inner bath down along the full length of the mandrel also presents a problem due to the coriolis effect which causes the bath to run in a stream that spirals around the mandrel. These problems are resolved by providing a mandrel structure which is extendable from the extrusion die. With such an arrangement, the mandrel extends only a short distance from the die at the start of extrusion and then is extended to its full length for steady state operation. Switching the internal bath introduction from a high position on the mandrel on start-up to a low position during steady-state operation resolves the spiraling flow problem. A specific extendable mandrel structure is disclosed in a copending application Ser. No. 08/827,130.

It has been found that certain properties of the cellulose film formed by tubular extrusion as described in the '857 patent are enhanced by increasing the length of the enlarged lower portion of the mandrel.

It is speculated that maintaining the extruded tube in a stretched condition for a longer time by keeping it in contact with the enlarged lower end or "sizing portion" of the mandrel allows desirable orientation characteristics of the gel tube to "set". Whatever the reason, a longer contact time with the sizing portion of the mandrel (by increasing the length of the lower end) has been found to be desirable. However, it has been found that increasing the length of the sizing portion of the mandrel gives rise to another problem. In this respect, gas bubbles evolve or are generated over the length of the sizing portion at the interface between the surface of the sizing portion and the inside surface of the extruded tube. The exact origin of these bubbles is not known. The bubbles could be formed by out gassing of air from the extruded tube. This could be the case, for example, if ground pellets of the solution are fed to the extruder and melted as the source of the thermoplastic solution. Bubbles also are possibly generated during regeneration of the cellulose as the cellulose solvent is removed in the nonsolvent bath. In any event, these bubbles cause weak spots in the resulting gel tube. Also, they may congregate or coalesce to form a bubble large enough to deform the diameter of the gel tube. Further, these bubbles may work upward and enter the volume defined between the mandrel shaft and the inside surface of the extruded tube. Excessive pressure in this volume can cause excessive expansion of the extruded tubing and disrupt the extrusion process.

Accordingly, it is an object of the present invention to provide an improvement in apparatus for extruding a seamless tube of a thermoplastic nonderivatized cellulose solution.

A further object of the present invention is to provide an improved apparatus for extruding a seamless tube of a thermoplastic nonderivatized cellulose solution which prevents the build-up of gas pressure within the extruded tube.

Another object is to provide an apparatus as described above wherein the thermoplastic solution is extruded downwardly about a mandrel which has a sizing portion to diametrically expand the tube and the sizing portion including means allowing the passage of gas into the volume of the extruded tube below the sizing portion.

Yet another object of the present invention is to provide an improved apparatus as described above wherein the sizing portion of the mandrel includes means for withdrawing gas from the volume of the extruded tube below the mandrel.

SUMMARY OF THE INVENTION

In the present invention, a tube of thermoplastic nonderivatized cellulose is downwardly extruded through a long air gap and into a bath of nonsolvent liquid as is generally disclosed in U.S. Pat. Nos. 5,277,857 and 5,451,364, the disclosures which are incorporated herein by reference.

For purposes of this specification "nonderivatized" cellulose means a cellulose which has not been subjected to covalent bonding with a solvent or reagent but which has been dissolved by association with a solvent or reagent through Van der Waals forces such as hydrogen bonding. "Nonsolvent" means a liquid which is not a cellulose solvent.

The extrusion is about a mandrel which depends from the extrusion die. The mandrel has a shaft portion and a lower end portion which is larger in diameter than the shaft. The mandrel is long enough to extend through the air gap and into the bath of nonsolvent liquid. However, the mandrel is extensible from the die so that on start-up, the mandrel is in a raised position. This locates the lower end of the mandrel above the level of nonsolvent liquid in the bath and presents a relatively short mandrel for the start-up operation.

After the leading end of the extruded tube is drawn passed the lower end of the mandrel, the mandrel is extended from the die until the mandrel spans the full air gap and the lower end of the mandrel is below the level of the nonsolvent liquid in the bath.

The lower end or "sizing portion" of the mandrel has a diameter larger than the extruded diameter of the thermoplastic tube so the tube is stretched as it passes over the sizing portion. As noted above, gas bubbles tend to generate at the interface between the outer surface of the sizing portion and the inside surface of the extruded tube. Circumferential channels in the sizing portion provide means for collecting these gas bubbles. The channels are spaced along the sizing portion so bubbles may be collected at various locations. In addition, the channels are connected by vertical slots so the bubbles in one channel can migrate to a lower channel. The lowest channel has a slot which directs bubbles to the volume below the lowermost end of the mandrel sizing portion. A conduit extending axially through the nozzle provides means for removing gases from this volume.

Accordingly, the invention may be characterized in one aspect thereof by an apparatus for extruding a seamless tubular film from a thermoplastic solution composed of nonderivatized cellulose, a tertiary amine oxide cellulose solvent and water by extruding a tube of the solution downwardly from an annular die. through an air gap and into an outer bath of a nonsolvent liquid, the extrusion being about a mandrel comprising:

a) a shaft which depends from the die;
   b) a sizing portion at a lower end of the shaft which is disposed at least partly below the level of the liquid in the bath, said sizing portion having a diameter adapted to diametrically size the tubular extrusion; and
   c) said sizing portion having an outer cylindrical surface provided with means for accumulating gas bubbles which are evolved from the extruded tube and appear at the interface between the inner surface of the extruded tube and the outer cylindrical surface of said sizing portion.

Other objects and advantages of this invention will be apparent from the ensuing detailed disclosure and appended claims.

DETAILED DESCRIPTION OF THE INVENTION

Figure 1:
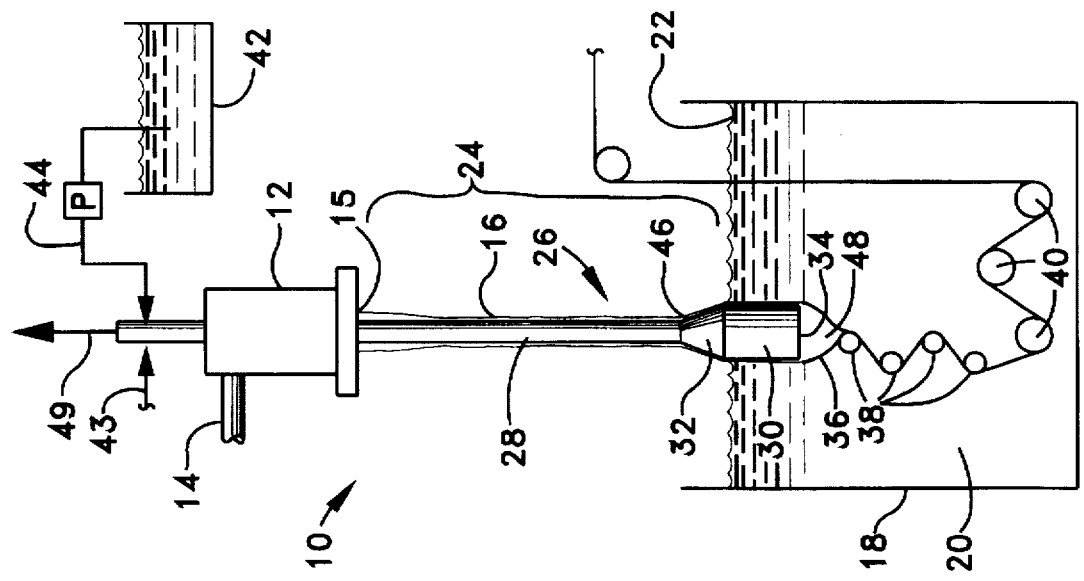
FIG. 1 is a schematic view showing the apparatus of the present invention during the course of steady-state extrusion.

Referring to the drawings, FIG. 1 shows the apparatus generally indicated at 10 during the course of steady-state operation. The apparatus includes a die 12 arranged to downwardly extrude a thermoplastic cellulose solution. The die inlet 14 receives the molten solution under pressure from any appropriate source (not shown). The source, for example, may be an extruder as disclosed in the '857 and '364 patents which melts and pumps ground pellets of the thermoplastic solution or a pumping system which delivers the thermoplastic solution to the die as it is made. The solution is generally a solution of a natural cellulose (such as wood pulp) dissolved in a cellulose solvent comprising N-methyl-morpholine-N-oxide (NMMO) and water. Methods of making an appropriate solution (hereafter called "dope") for extrusion as a tubular film are well known in the art and comprises no part of the present invention. It also is within the skill of the art to alter the composition and properties of such a solution to obtain desired properties of the cellulose article formed from the solution. Process parameters also effect the properties of the resulting article and reference is made to a further discussion of such parameters as set out, for example, in the '857 and '364 patents and in U.S. Pat. No. 5,658,525 the disclosures of which are incorporated herein by reference.

The die has an annular extrusion orifice 15 so the molten dope is extruded as a seamless tube indicated at 16. For purposes of extruding a small diameter food casing, the extrusion orifice is about 12–14 mm in diameter. As shown in FIG. 1, the die is arranged above a vessel 18 which contains a bath 20 (some times referred to as an "outer bath") comprising nonsolvent liquid. For purposes of the present invention, "nonsolvent" means a liquid which is not a cellulose solvent. Water or an aqueous solution containing a low concentration of NMMO are preferred nonsolvents for purposes of the present invention. The die is spaced well above the level 22 of the bath so the tube is extruded downwardly through a long air gap 24. This air gap may be 381 mm to 500 mm or more in length.

Depending from the die is a mandrel, generally indicated at 26, which extends from the die to below the bath level 22. The mandrel has a shaft portion 28 and a lower end 30. The lower end is larger in diameter than the shaft and preferably is equal to or most preferably is larger in diameter than the diameter of the annular extrusion orifice 15 of the die 12. The lower end 30, thus, comprises a means for diametrically stretching or "sizing" the extruded tube and is referred to hereafter as the mandrel sizing portion. The mandrel sizing portion 30, including a conical transition section 32 preferably are made of a hydrophobic material such as tetrafluoroethylene and has its lowermost end face 34 disposed below the bath level 22.

As the extruded tube 16 enters the bath, the NMMO solvent is drawn from the tube causing regeneration of the dissolved cellulose to form a so called "gel tube" 36 of pure cellulose. This gel tube is collapsed to a flat width by a series of fingers or baffles 38. The baffles 38 function as a ladder to collapse the tube to its flat width. Preferably, the horizontal position of each baffle 38 as viewed in FIG. 1 is adjustable. By adjusting the horizontal relationship between baffles, the correct position can be found to collapse the gel tube to its flat width in a wrinkle-free manner.

After collapsing to a flat width, the gel tube is drawn through an S-wrap formed by driven rollers 40. The S-wrap and driven rolls serve to draw the extruded tube 16 in the machine direction which causes a thinning of the tube wall and imparts a degree of machine direction orientation to the extruded tube in the air gap. The gel tube then is directed up and out of the bath vessel 18 for further processing. For example, it should be understood that the gel tube may still contain NMMO after leaving the bath vessel so that a further operation would be washing to remove as much NMMO cellulose solvent as possible. Subsequent operations also would include contacting the gel tube with a plasticizer such as glycerine or the like and then drying the tube to a desired water content while holding the tube at a desired inflated diameter. These subsequent operations likewise form no part of the present invention.

The tubular extrusion process, as disclosed in the '857 and '364 patents, further includes the introduction of air and a nonsolvent liquid into the interior of the extruded tube 16. Both air and the nonsolvent, hereafter called "the inner bath", are introduced through the mandrel. An air line 43 connected to the upper end of mandrel shaft 28 provides an air flow through the mandrel to openings (not shown) which vent the air into the interior of the extruded tube. One function of this air is to hold the extruded tube open at the start of the extrusion process. The nonsolvent liquid for the inner bath is contained in a vessel 42. From the vessel, it is pumped through flow line 44 to a conduit (not shown) which runs through the mandrel. One or more ports in the mandrel allow the inner bath to exit the mandrel and flow down the surface of the mandrel shaft 28. The inner bath is cooler than the extruded tube 16 so it draws heat from the extruded tube 16 and helps to cool the extruded tube in the air gap. It is believed that cooling in the air gap enhances properties of the resulting tubular film.

The inner bath flows down the mandrel shaft 28 and forms a pool 46 around the lower end of the mandrel. This pool provides lubrication to permit the passage of the extruded tube over the mandrel sizing portion 30. This pool further starts the regeneration of the cellulose at the inner surface of the extruded tube. The inner bath passes down between the mandrel sizing portion and the extruded tube and flows into the volume 48 of bath liquid within the tube. Some of the liquid in this volume 48 remains within the gel tube when it is collapsed to a flat width by baffles 38. This portion of liquid from volume 48 prevents blocking of the flattened gel tube and is carried out with the flattened tube between rolls 40. During the course of operation, an excessive amount of internal bath liquid could accumulate in volume 48. Accordingly, it may be necessary to remove liquid from this volume by suction through a conduit (not shown) having an inlet (also not shown) in the lower end face 34 of the mandrel. In this fashion, liquid from this volume can be drawn up through the mandrel as indicated by arrow 49.

With an air gap 24 of 381 mm to 500 mm or even greater, the start-up of extrusion is difficult using a mandrel 26 which spans the full length of the air gap. It is noted above, that at the start of extrusion the leading end of the extruded tube 16 must not contact the mandrel shaft as the leading end is led down the mandrel, over the sizing portion 30 and into the bath 20. This is difficult to accomplish with a long mandrel. While lubrication of the mandrel shaft with an internal bath facilitates drawing the leading end of the extruded tube down the mandrel, introducing the internal bath high up on the mandrel so it can lubricate the full length of the shaft also presents a problem discussed above.

Figure 2:
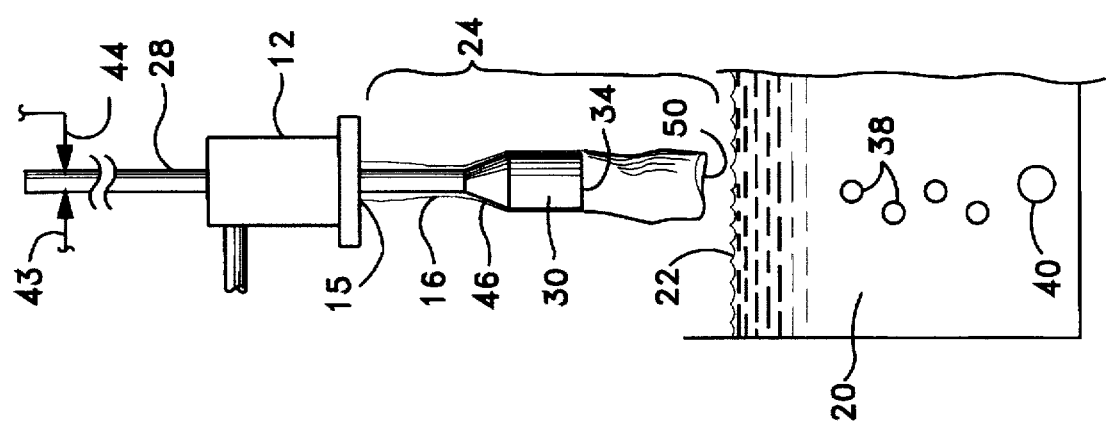

These problems are resolved by the method and apparatus of the present invention. In this respect, the mandrel shaft 28 is arranged to slidably extend through the die 12. On start-up, as shown in FIG. 2, the mandrel shaft 28 is raised so the lower end face 34 of the mandrel is located in the air gap 24 and well above the bath level 22. When extrusion of tube 16 starts, air through line 43 and an internal bath through line 44 are introduced through the mandrel to mandrel openings (not shown) at a location near the extrusion orifice 15 of die 12. The air initially helps to keep the extruded tube open and the introduced internal bath lubricates the short mandrel structure depending from die 12. The short mandrel structure, as shown in FIG. 2, makes it easier to draw the leading end 50 of the extruded tube along the mandrel and over the mandrel sizing portion 30. As the leading end passes over the sizing portion, the inner bath begins forming the pool 46 around the mandrel sizing portion. The leading end 50 is then extended into the bath 20 and laced around the baffles 38 and through the S-wrap rolls 40.

Figure 3:
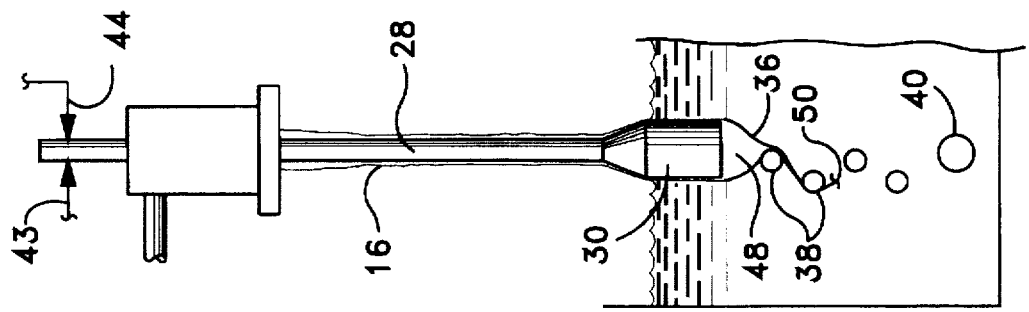
FIGS. 2 and 3 are views similar to FIG. 1 only showing the apparatus after start-up and prior to steady state operation.

After the leading end 50 of the extruded tube is beyond the lowermost end 34 of the mandrel, the mandrel shaft 28 is moved downward, as shown in FIG. 3, to lengthen the effective length of mandrel. The shaft continues to move downward until the sizing portion 30 of the mandrel is below the bath level 22 for steady-state operation, as shown in FIG. 1. As the mandrel sizing portion moves downward, the air which is introduced through line 43 maintains a desired positive pressure within the extruded tube.

In the course of moving the mandrel downward, the location of the inner bath inlet is switched from a location near the die 12 to a location much lower on the mandrel. This avoids the problem noted above of the inner bath flowing on a spiral stream around the shaft with such speed that drops fling off and contact the inner surface of the extruded tube. However, as the mandrel shaft is lowered, air still is introduced at a higher location to fill the lengthening volume between the inside surface of the extruded tube and the outside surface of the mandrel shaft. This replacement introduction of air provides a positive pressure which prevents the extruded tube from collapsing against the mandrel and disrupting the extruding operation.

Figure 4:
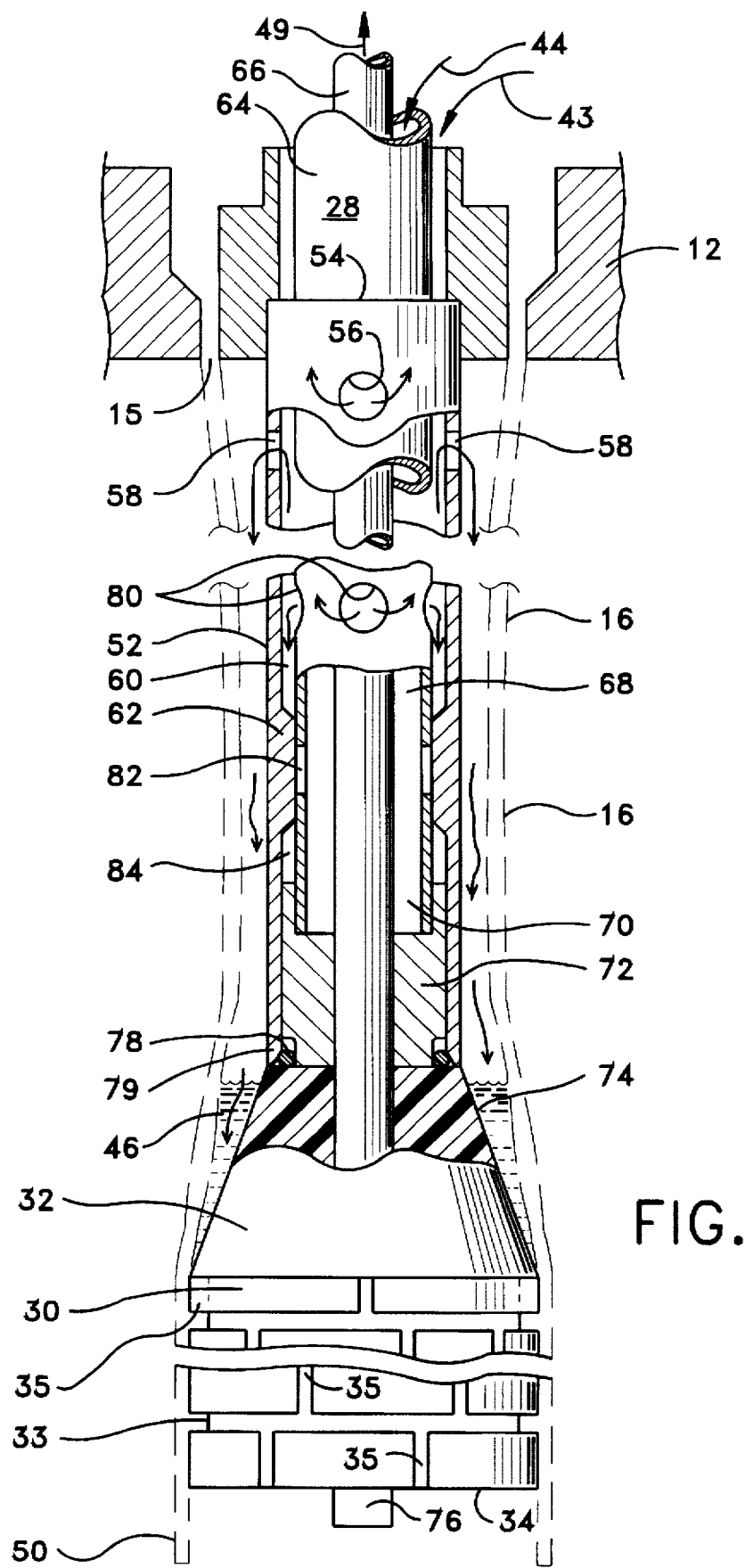
FIG. 4 is a view on an enlarged scale, partly broken away and in section showing the mandrel structure at the start-up of the extrusion operation.
Figure 5:
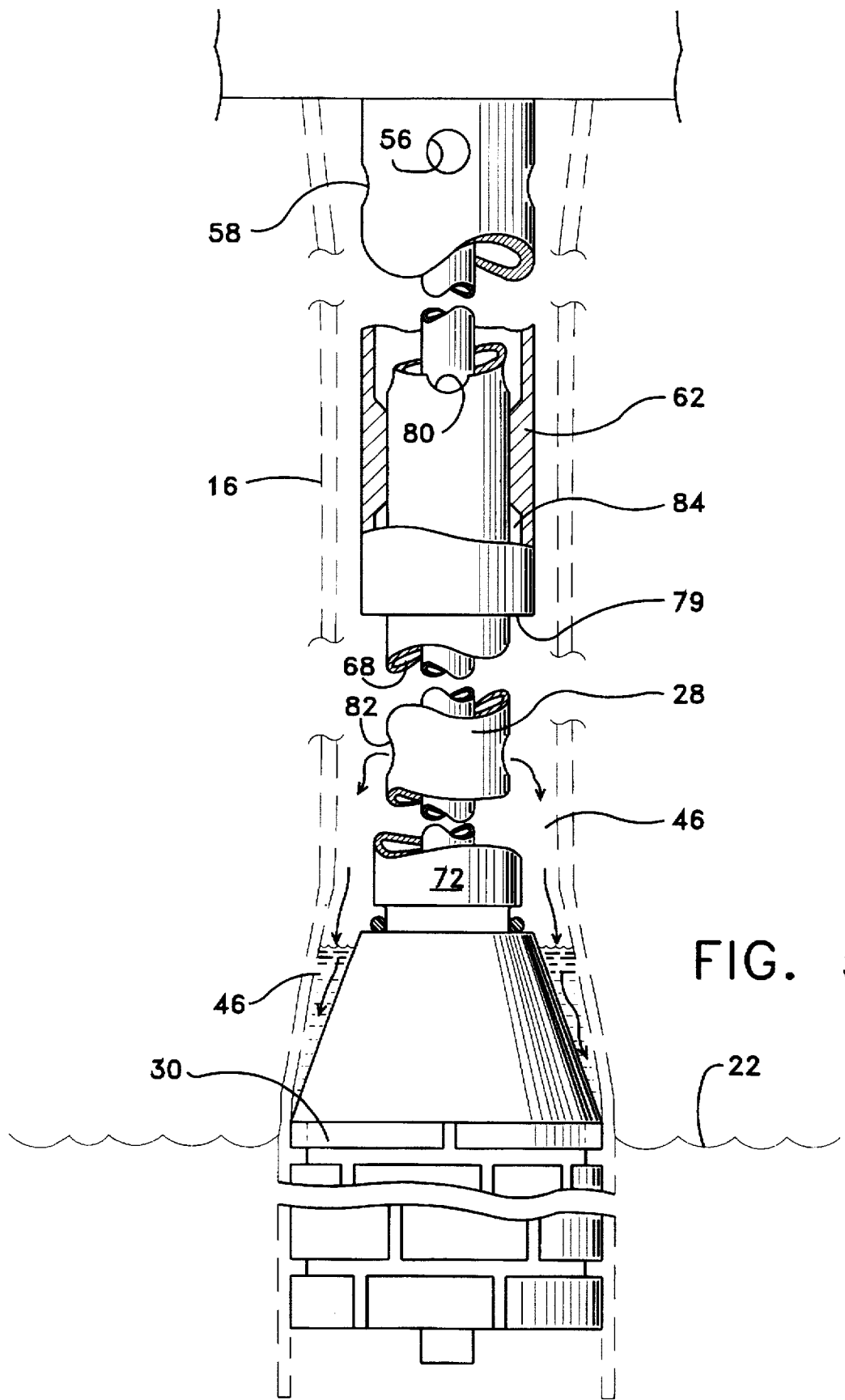
FIG. 5 is a view similar to FIG. 4 only showing the mandrel structure after start-up and during the course of steady-state operation.

The mandrel structure is illustrated in more detail in FIGS. 4 and 5. It should be appreciated that components are not necessarily drawn to scale in order to facilitate illustration of the mandrel structure.

As seen in FIG. 4, the mandrel 26 has a fixed sleeve 52 which supports the movable mandrel shaft 28. The sleeve is fixed at its upper end 54 to the die 12. Openings 56 and 58 in the sleeve provide the initial outlets for air and inner bath respectively, as set out herein below.

The movable shaft 28 extends concentrically through the sleeve so the sleeve and shaft define an annular space 60 therebetween. At its upper end, this space communicates with the air supply 43 shown in FIGS. 1-3. At its lower end, this space 60 is closed by an internal shoulder 62 which bears against shaft 28. This shoulder not only closes off the lower end of space 60 but provides bearing support for the shaft when the shaft is extended downward.

The mandrel shaft 28 is formed by concentric tubes including an outer tube 64 and an inner tube 66. These tubes 64, 66 define an annular space 68 therebetween. The space 68 is closed at its lower end 70 by a cap 72 over the end of the outer tube. The upper end of space 68 is in communication with the internal bath flow line 44 of FIGS. 1-3.

The inner tube 66 extends down through the end cap 72. Attached about the lower end of the inner tube is the mandrel sizing portion 30 including its conical transition section 32. Inner tube 66 has its lowermost end 76 opening through the lowermost end face 34 of the sizing portion. The upper end of the inner tube 66 is connected to a vacuum source (not shown) for purposes of aspirating bath liquid up through the inner tube as shown by arrow 49.

The conical transition section 32 at one end 74 has a diameter about equal to the diameter of sleeve 52. The conical section then flares outwardly at its other end to the full diameter of the enlarged mandrel sizing portion 30. Preferably, the mandrel sizing portion and its conical transition section are made of a low friction material such as tetrafluoroethylene.

The diameter of the mandrel sizing portion 30 preferably is between about 1.5 and 2.5 times the diameter of the extrusion orifice 15. This imparts a transverse stretch to the extruded tube and helps to set the desired gel tube diameter. The length of the sizing portion 30 also contributes to the dimensional stability of the gel tube which is formed. A length at full diameter of about 50 mm is preferred.

As best seen in FIGS. 1-3, the mandrel sizing portion 30 is generally cylindrical. As shown in FIGS. 4 and 5, the outer surface of the sizing portion 30 is provided with a series of vertically spaced circumferential grooves 33 which are connected by vertical channels 35. These grooves and channels allow for the escape of air from around the sizing portion as further described hereinbelow.

Disposed on the smaller end 74 of conical section 32 is an O-ring or other appropriate seal member 78. With the shaft in the position, as shown in FIG. 4, the seal member 78 bears against the lower end 79 of sleeve 52 to seal off the lower end of the sleeve.

To complete the structure, the outer tube 64 of mandrel shaft 28 has a plurality of vertically spaced ports 80, 82 spaced along its length. When shaft 28 is in the position as shown in FIGS. 2 and 4 so that mandrel 26 is at its shortest depending length from die 12, the lower ports 82 are closed by the sleeve internal shoulder 62 (FIG. 4) whereas the upper ports 80 located above the internal shoulder are open into space 60.

The operation will be described beginning with reference to FIGS. 2 and 4. At the start of extrusion, the mandrel shaft 28 is in a raised position so it extends through the die 12 as shown in FIG. 2. This places the mandrel 26 at its shortest depending length which locates the lowermost end face 34 of the mandrel well above the bath level 22 (FIG. 2). The mandrel components are positioned as seen in FIG. 4.

A nonsolvent comprising the inner bath is pumped through line 44 and into the space 68 between the inner and outer conduits 66, 64 respectively which comprise shaft 28. The inner bath fills this space and passes through ports 80 into the space 60 between the shaft 28 and the surrounding sleeve 52. The inner bath fills the space 60 up to the level of openings 58. The inner bath then spills from these openings 58, runs down the outer surface of the sleeve 52 and over the mandrel sizing portion 30. Liquid dripping from the lower end of the mandrel falls into the bath 20.

At the same time, air is introduced through line 43 and into space 60. Air introduced in this fashion vents from the sleeve through at least openings 56 which are slightly higher on the sleeve than the opening 58.

Extrusion is started and the leading end of the extruded tube 16 is drawn down and over the sleeve 52. The inner bath liquid spilling from openings 58 flows down along the outer surface of the sleeve. This provides lubrication to prevent the extruded tube from binding to the sleeve should contact occur. Air from openings 56 helps to hold the extruded tube open and away from the sleeve surface as the tube is drawn down along the sleeve. When the leading end 50 of the extruded tube is stretched and pulled over the sizing portion 30 (FIG. 2), the inner bath collects in pool 46 which forms around the lower end of the mandrel. Nonsolvent liquid from this pool is carried out from between the inner surface of the extruded tube and the outer surface of the sizing portion to lubricate this area and permit the drawing of the extruded tube 16 pass the mandrel lower end.

The leading end 50 of the extruded tube then passes into the outer bath 20 to form the gel tube 36 (FIG. 3). The gel tube is laced around the baffles 38 to flatten the tube. The flattened gel tube 36 then is put through the S-wrap rolls 40 and eventually led out of the vessel 18 (FIG. 1). After the leading end of the extruded tube is beyond the lowermost end 34 of the mandrel, the mandrel shaft 28 is lowered by sliding though the die 12.

As shaft 28 is extended, the O-ring seal 78 moves out of engagement with the lower end 79 of the sleeve. When the lower ports 82 move pass the sleeve internal shoulder 62, internal bath liquid floods into the sleeve volume 84 below the shoulder which is vacated by the cap 72. Some seepage of the internal bath can occur from around the cap. However, the main flow continues through those ports 80 still located above the internal shoulder and into space 60 so that the internal bath still issues from sleeve openings 58.

When the cap 72 is clear of the sleeve's lower end 79 (FIG. 5), internal bath liquid contained in the volume 84 spills out and flows over the cap. The internal bath liquid from space 68 can now flow directly from ports 82 below sleeve shoulder 62 and down along the shaft 28 and cap to the mandrel sizing portion 30. Clearing the cap 72 through the lower sleeve end 79 terminates the flow of internal bath out through the opening 58 high up on the sleeve because the internal bath liquid can now issue directly into the air gap 24 from the openings 82 in the mandrel shaft 28.

Air continues to issue from sleeve openings 56. The continued introduction of air into the extruded tube, as the shaft 28 is extended downward is important. In this respect, the introduction of air into the increasing volume between the mandrel shaft and extruded tube 16 maintains a differential pressure across the extruded tube to prevent the extruded tube from collapsing against the mandrel shaft 28.

When the shaft is fully extended, the mandrel sizing portion 30 is beneath the bath level 22 of the outer bath 20, as shown in FIGS. 1 and 5, for steady state extrusion operation. During steady state extrusion, the level of the pool 46 around the lower end of the mandrel is kept slightly higher than the level 22 of the outer bath 20 by about 50–60 mm. At this level, the pool 46 exerts a sufficient internal pressure on the extruded tube 16 to keep the tube radially spaced from the sleeve end 79 as the extruded tube necks down. This pool level also keeps the lower end of the extruded tube flared to facilitate the transition of the extruded tube over the larger diameter of the mandrel sizing portion 30. This higher pool or internal bath level is maintained primarily by controlling the air pressure within the extruded tube as provided by the introduction of air from line 43. In this respect, the level of pool 46 is visually monitored and the volume of air introduced through line 43 (FIG. 1) is manually adjusted to keep the pool at the desired level.

During the course of extrusion, gas bubbles may appear at the interface of the extruded tube and the mandrel sizing portion. It is not known with certainty why these gas bubbles form. It is speculated that the gas is air which becomes dissolved in the molten thermoplastic solution during the formation and extrusion of the solution. This so called "soluble air" remains in solution so long as the molten thermoplastic solution is under pressure. However, once the solution is extruded, this soluble air is released as an out gas from the extruded tube.

In any event, a portion of gas released from the inner surface of the tube becomes trapped between the inner surface of the extruded tube and the surface of the mandrel sizing portion. The circumferential grooves 33 and vertical channels 35 connecting these grooves provide means for gathering the gas bubbles and passing them into the volume 48 below the mandrel lowermost end face 34. Should the gas or internal bath liquid in volume 48 become excessive, they can be removed by suction up through the inner tube 66 as described hereinabove.

The grooves 33 and channels 35 are relatively shallow. Both are about 0.76 mm deep. The grooves 33 are about half the width of the vertical channels (1.27 mm vs. 3.17 mm). This arrangement allows the extruded tube to pull the gas bubbles downward as the extruded tube passes over the sizing portion. Moving the gas bubbles downward through the grooves and channels eventually causes the gas bubbles to move into the volume 48 below the mandrel. From this volume, the gas bubbles can be removed by aspirating up through conduit 66. To facilitate this removal, the lower end face of the sizing portion can be slightly concave so gas bubbles will gather in the confines of this concave shape and be aspirated. Even gas bubbles appearing at the lower end of the pool 46 near the mandrel sizing portion 30 tend to be pulled downward by the action of the downwardly moving extruded tube. Occasionally, a gas bubble may move upward into the volume within the extruded tube but above the sizing portion. If need be, the air introduced into this volume can be adjusted as noted above to correct for any variations resulting from gas bubbles that avoid the downward pull of the extruded tube and instead move upward.

The circumferential grooves 33 provide a further advantage in addition to removal of the gas bubbles in that each groove provides an air bearing function. In this respect, the gas accumulating in the grooves provides an air bearing support for the extruded tube which passes over the mandrel sizing portion 30. This reduces friction between the extruded tube and the mandrel sizing portion and facilitates the extrusion process and the formation of the gel tube 36.

Thus, as shown in FIG. 5, in steady-state operation through the long air gap, the internal bath issues from ports 82 in the mandrel shaft 28. These ports 82 are considerably lower on the mandrel structure than the openings 58 from which the internal bath flowed on start-up. This avoids the problem presented by the spiral flow of the internal bath down substantially the full length of the mandrel as noted above.

The sleeve 52, with its upper end 54 rigidly connected to the die, remains stationery. This allows the internal shoulder 62 to provide bearing support for the extended mandrel shaft at a location spaced from the die. The stability provided by this bearing support is preferred especially in cases where the shaft is small enough in diameter to provide clearance from the inner surface of a small diameter extruded tube. For example, on leaving the die 12, the extruded tube 16 may be as small as 12.7 mm in diameter. The extruded tube cools and contracts in the air gap so the tube becomes smaller in diameter. Drawing through the air gap in the machine direction causes the tube to neck down which still further reduces diameter. Consequently, extruded tube 16 having an initial diameter of 12.7 mm, at some point along shaft 28 may have a diameter close to 6.55 mm. This means the shaft must be even smaller in diameter to provide radial clearance between it and the extruded tube 16.

At the lower end of the mandrel, the diameter of the extruded tube is stretched as it passes over the mandrel sizing portion 30. The depth of the pool 46 and resulting head pressure help with the opening and stretching of the extruded tube to facilitate passage over this portion of the mandrel.

The extensible mandrel concept as described herein facilitates the start-up operation and switching the introduction of the inner bath to a lower elevation avoids having the internal bath assume a spiral flow down and around the long mandrel shaft.

In accordance with the present invention, providing the mandrel sizing portion 30 with the spaced circumferential grooves 33 allows for the gathering of gas bubbles into these channels. This gathering of gas bubbles into the grooves removes these bubbles to a location where they will not disrupt the formation of the gel tube. The gas bubbles gathering in grooves 33 also provide an air bearing effect to reduce friction between the extruded tube and the sizing portion to facilitate extrusion. The vertical channels 35 which connect the grooves 33 serve as a means to channel the gas bubbles into the volume 48 (FIGS. 1 and 3) below the mandrel. From this volume, the gas (and any excess internal bath liquid) can be removed by aspiration through the inner tube 66.

Although a preferred embodiment of the present invention has been described in detail, it is understood that modifications thereof may be made without changing the spirt and scope of the invention as claimed. For example, the exact composition of the extruded dope, extrusion rates, draw ratios and other process parameters can be altered as desired to achieve desired properties of the resulting tubular film. Likewise, altering dimensions of the mandrel structure may result in altering film properties and are within the skill of the art. For example, increasing the length of the enlarged mandrel lower end which extends into the outer bath may provide the resulting film with enhanced diametrical uniformity. Such changes form no part of the present invention.

Having described the invention in detail, what is claimed as new is:

1. A mandrel structure for sizing a tubular extrusion composed of a thermoplastic cellulose solution which is extruded downward from a die and about the mandrel and into a bath containing a liquid for regenerating cellulose from the thermoplastic solution, said mandrel comprising:
   a) a shaft which depends from the die;
   b) a sizing portion at a lower end of the shaft which is disposed at least partly below the level of the liquid in the bath, said sizing portion having a diameter adapted to diametrically size the tubular extrusion; and
   c) said sizing portion having an outer cylindrical surface provided with means for accumulating gas bubbles which are evolved from the extruded tube and appear at the interface between the inner surface of the extruded tube and the outer cylindrical surface of said sizing portion.

2. A mandrel as in claim 1 wherein said cylindrical surface has at least one circumferential groove and said groove being said means for accumulating gas bubbles.

3. A mandrel as in claim 2 including a plurality of said circumferential grooves spaced along said cylindrical surface.

4. A mandrel as in claim 2 including a plurality of said circumferential grooves spaced along said cylindrical surface and said cylindrical surface further includes vertical channels which connect one of said grooves to another.

5. A mandrel as in claim 4 including at least one vertical channel which communicates with a volume within the extruded tube and below said sizing portion.

6. A mandrel as in claim 5 wherein said mandrel includes aspirating means for withdrawing gas bubbles from said volume.

7. A mandrel as in claim 6 where said aspirating means includes an axial conduit extending through said mandrel, said conduit having an inlet opening through said mandrel lowermost end face and an outlet communicating with means for evacuating said conduit.

8. A mandrel structure for diametrically sizing a tubular extrusion formed of a thermoplastic cellulose solution composed of a nonderivatized cellulose, a tertiary amine oxide cellulose solvent and water by extruding downwardly from a die, through an air gap and into a bath containing a liquid for regenerating cellulose from the extruded thermoplastic solution, said mandrel comprising:
   a) a shaft which depends from the die;
   b) a sizing portion at the lower end of said shaft, said sizing portion being generally cylindrical with a diameter larger than the diameter of the extruded tube such that the extruded tube is diametrically expanded as it passes over said sizing portion;
   c) said sizing portion having means on its surface for accumulating any gas bubbles which appear at the interface between the extruded tube and the surface of said sizing portion and for channeling the bubbles to a volume within the extruded tube and below said sizing portion; and
   d) means for aspirating gas bubbles from said volume up through said mandrel shaft.

9. A mandrel structure as in claim 8 wherein said sizing portion has a plurality of spaced circumferential grooves for accumulating said gas bubbles and vertical channels connecting said grooves including at least one channel opening into said volume, said grooves and channels providing said means for accumulating and channeling gas bubbles into said volume.

10. A method of extruding a seamless cellulose tube comprising:

a) downwardly extruding from an annular die, a tube composed of a thermoplastic cellulose solution wherein said extruding occurs through an air gap, about a mandrel depending from the die and into an outer bath containing a nonsolvent liquid for regenerating cellulose from the thermoplastic solution;

b) passing the extruded tube over a sizing portion at a lower end of the mandrel to diametrically stretch the extruded tube;

c) introducing a nonsolvent liquid into the interior of the extruded tube which forms a pool of liquid around the sizing portion;

d) providing means on said sizing portion for accumulating gas bubbles which evolve from the extruded tube at the interface between the extruded tube and the surface of the sizing portion;

e) drawing the accumulated gas bubbles downward along the periphery of the sizing portion and into a volume within the extruded tube and below the sizing portion; and f) aspirating the gas bubbles from said volume upwardly through said mandrel.

11. A method as in claim 10 comprising accumulating the gas bubbles in circumferential grooves formed in said sizing portion and driving said accumulating gas bubbles downwardly through vertical channels which connect said grooves and into said volume.

12. A method as in claim 11 wherein the driving of the gas bubbles downwardly is in response to the downward movement of the extruded tube.

* * * * *